United States Patent
Bihel et al.

(10) Patent No.: US 9,624,946 B2
(45) Date of Patent: Apr. 18, 2017

(54) DOUBLE HYDRAULIC VALVE OF A SERVO-CONTROL FOR FEATHERING THE BLADES OF A ROTORCRAFT ROTOR

(71) Applicant: AIRBUS HELICOPTERS, Marignane (FR)

(72) Inventors: Jean-Romain Bihel, Le Rove (FR); Pascal Leguay, Alleins (FR); Thibaut Marger, Gignac-la-Nerthe (FR)

(73) Assignee: AIRBUS HELICOPTERS, Marignane (FR)

( * ) Notice: Subject to any disclaimer, the term of this patent is extended or adjusted under 35 U.S.C. 154(b) by 308 days.

(21) Appl. No.: 14/277,422

(22) Filed: May 14, 2014

(65) Prior Publication Data

US 2015/0176612 A1   Jun. 25, 2015

(30) Foreign Application Priority Data

May 17, 2013 (FR) ..................... 13 01144

(51) Int. Cl.
    *F15B 13/01* (2006.01)
    *F16K 11/07* (2006.01)
    (Continued)

(52) U.S. Cl.
    CPC .............. *F15B 13/01* (2013.01); *B64C 13/40* (2013.01); *B64C 27/605* (2013.01); *B64C 27/64* (2013.01); *F15B 11/02* (2013.01); *F15B 13/0402* (2013.01); *F15B 20/008* (2013.01); *F16K 11/07* (2013.01); *F16K 11/0704* (2013.01);
    (Continued)

(58) Field of Classification Search
    CPC ....... B64C 13/40; B64C 13/42; B64C 27/605; B64C 27/64; F15B 13/01; F15B 13/0402; F15B 11/02; F15B 20/008; F15B 2211/8757; F15B 2211/8636;
    (Continued)

(56) References Cited

U.S. PATENT DOCUMENTS 3,529,514 A   9/1970   Mayo et al.
4,128,047 A   12/1978  Caero
(Continued)

FOREIGN PATENT DOCUMENTS

| FR | 2444825 | 7/1980 |
|----|---------|--------|
| FR | 2916492 | 11/2008 |
| GB | 2038511 | 7/1980 |

OTHER PUBLICATIONS

French Search Report for FR 1301144, Completed by the French Patent Office on Feb. 7, 2014, 7 Pages.

*Primary Examiner* — Logan Kraft
(74) *Attorney, Agent, or Firm* — Brooks Kushman P.C.

(57) ABSTRACT

A hydraulic valve (3, 3') of a servo-control for feathering the blades (1) of a rotorcraft rotor. The hydraulic valve (3, 3') comprises a main valve member (5) and an emergency valve member (6) blocked relative to a valve cylinder (4) of the hydraulic valve (3, 3') by means of a pin (23) in sliding thrust engagement in a cavity (24) of the emergency valve member (6). Relative movement between the emergency valve member (6) and the valve cylinder (4) initiating sliding movement of the pin (23) inside the cavity (24) and causing mover means (27) for moving the pin (23) to be put into operation, thereby releasing the emergency valve member (6) to move freely.

21 Claims, 5 Drawing Sheets

(51) Int. Cl.
  *B64C 27/605* (2006.01)
  *B64C 27/64* (2006.01)
  *F15B 20/00* (2006.01)
  *B64C 13/40* (2006.01)
  *F15B 11/02* (2006.01)
  *F15B 13/04* (2006.01)

(52) U.S. Cl.
  CPC ... *F16K 11/0708* (2013.01); *F15B 2211/8636* (2013.01); *F15B 2211/8752* (2013.01); *F15B 2211/8757* (2013.01)

(58) Field of Classification Search
  CPC ........ F15B 2211/864; F15B 2211/8752; F16K 11/07; F16K 11/0704; F16K 11/0708
  See application file for complete search history.

(56) References Cited

U.S. PATENT DOCUMENTS 6,981,439 B2 * 1/2006 Hart ................. B64C 13/42
                                                    60/403
7,984,670 B2   7/2011 Sequera et al.

* cited by examiner

DOUBLE HYDRAULIC VALVE OF A SERVO-CONTROL FOR FEATHERING THE BLADES OF A ROTORCRAFT ROTOR

CROSS REFERENCE TO RELATED APPLICATION

This application claims priority to French patent application No. FR 13 01144 filed on May 17, 2013, the disclosure of which is incorporated in its entirety by reference herein.

BACKGROUND OF THE INVENTION (1) Field of the Invention

The present invention relates to the field of rotary wing aircraft having at least one rotor driven in rotation by a power plant. The present invention relates more particularly to servo-controls fitted to rotorcraft rotors in order to vary the angle of incidence of the blades of such a rotor.

(2) Description of Related Art

Rotorcraft are fitted with at least one main rotor having an axis that is substantially vertical and that provides the rotorcraft at least with lift. In the specific circumstance of a helicopter, the main rotor also provides the rotorcraft with propulsion and with guidance in pitching and in roll.

Rotorcraft are also commonly fitted with at least one anti-torque device as formed by an auxiliary rotor with an axis that is substantially horizontal and suitable also for providing the rotorcraft with guidance in yaw. By way of example, such an auxiliary rotor may be a tail rotor, and also by way of example it may indeed be a propulsive propeller in a helicopter having high speed propulsion.

In order to vary the attitude in flight of the rotorcraft, the pilot operates flight controls that cause the angle of incidence of the blades making up the rotary wing of said at least one rotor to vary. The pilot may be a human pilot or an autopilot. The angle of incidence of the blades is varied by feathering (moving) the blades, i.e. by causing their pitch to vary either cyclically or collectively. More particularly, the blades are hinge-mounted on the rotor so as to be capable of pivoting about their own longitudinal axes. The pivoting of the blades about their own axes in association with their rotation about the axis of rotation of the rotor gives rise to variation in their pitch that may be cyclic and/or collective.

For this purpose, and considering by way of example a main rotor, a swashplate comprises a non-rotating bottom plate associated with a rotating top plate serving to modify the angle of incidence of each of the blades at as a function of its individual position in azimuth. The bottom plate is controllable along three distinct flight control lines and the top plate is connected to each of the rotor blades by respective linkages. The bottom plate may be moved in any orientation in three dimensions relative to the mast of the rotor on which the bottom plate is guided.

Such an arrangement of the swashplate gives it freedom to move axially while also being capable of moving in all directions like a ball joint so as to vary the pitch of the blades depending on the flight commands issued by the pilot. The forces for moving the swashplate are potentially large, so it is useful to assist the pilot in delivering the force needed to feather the blades.

That is why it is common practice to use servo-controls for varying blade pitch. Servo-controls can assist a human pilot in terms of the forces that the pilot needs to deliver in order to vary blade pitch via a mechanical force transmission linkage. The servo-controls may also be operated by an actuator as a function of flight commands issued by an autopilot.

Conventionally, such a servo-control comprises a hydraulic actuator having at least one double-acting actuator cylinder fed with fluid under pressure from a fluid source of the rotorcraft. More particularly, the fluid is an incompressible fluid, specifically oil, enhancing the power and the accuracy obtained for feathering the blades.

The hydraulic actuator is potentially an actuator having a single actuator cylinder or an actuator having multiple actuator cylinders, each actuator cylinder housing a rod. Relative movement between the rod and the actuator cylinder receiving it is obtained by admitting fluid into the inside of the actuator cylinder, said relative movement being used to convert the hydraulic power developed by the servo-control into mechanical power for feathering the blades.

In a servo-control comprising a hydraulic actuator having multiple actuator cylinders, the actuator cylinders may for example be arranged in tandem, being combined in a common actuator cylinder and housing a common rod. Also by way of example, the actuator cylinders of a hydraulic cylinder having multiple actuator cylinders may be arranged in parallel, each receiving a respective rod, with the rods being mechanically connected together.

The actuator cylinder(s) is/are double-acting, being individually fed with fluid by a corresponding hydraulic circuit conveying fluid under pressure in both directions between the actuator cylinder and the fluid source. For return of the fluid to the fluid source, it is possible for the circuit to be at atmospheric pressure.

The rod is arranged as a piston and is mounted to move axially in both directions inside an actuator cylinder that receives it. The actuator cylinder has fluid flow passages at its opposite ends referred to as its top and its bottom. Relative movement between the rod and the actuator cylinder that receives it is caused to take place along each of the directions in which the rod can move by admitting fluid into the actuator cylinder via its top passage or via its bottom passage.

Depending on the ways in which the servo-control is installed on board the aircraft, the rod may be fastened to a structure of the rotorcraft in order to feather the blades by moving the actuator cylinder. Conversely, in a variant, the actuator cylinder may be fastened to the structure of the rotorcraft in order to feather the blades by moving the rod.

The operation of the hydraulic actuator depends on one or more hydraulic valves (valve distributor) included in the servo-control. Each actuator cylinder is fed individually with fluid under pressure by a hydraulic valve associated therewith. Such hydraulic valves may in particular be of the slide type or they may be of the rotary type, and they serve to direct the fluid delivered under pressure through the hydraulic circuits, thereby varying the hydraulic power developed by the hydraulic actuator.

Each hydraulic valve is placed on the hydraulic circuit between the fluid source and an actuator cylinder associated therewith, so that the supply of fluid under pressure to an actuator cylinder is governed by a hydraulic valve that is specific thereto.

Each hydraulic valve receives the fluid under pressure from the hydraulic circuit in which it is placed in order to feed fluid to the associated actuator cylinder, the fluid passing selectively through one or another of the passages. Conversely, each hydraulic valve discharges the fluid it receives from the actuator cylinder that is associated therewith, returning it to the fluid source.

By way of example, reference may be made to the following documents: U.S. Pat. No. 3,529,514 (Mayo Millard G. et al.), U.S. Pat. No. 4,128,047 (Caero J. G.), and FR 2 444 825 (Messerschmitt Boelkow Blohm), which describe such hydraulic valves as commonly used in the field of aviation.

More particularly, for a given hydraulic valve, a valve cylinder of the hydraulic valve has first ducts for putting the hydraulic valve into fluid flow communication with the fluid source. An admission duct is dedicated to admitting into the hydraulic valve fluid under pressure coming from the fluid source, while a discharge duct is dedicated to discharging fluid from the actuator cylinder out from the hydraulic valve and back to the fluid source.

The hydraulic cylinder also has second ducts for putting the hydraulic cylinder into fluid flow communication with the actuator cylinder via passages provided therein. One second duct is dedicated to establishing fluid flow communication between the hydraulic valve and the top passage, while another second duct is dedicated to establishing fluid flow communication between the hydraulic valve and the bottom passage. Such a hydraulic valve is typically a hydraulic valve having four ports and N stable positions, where N is not less than two.

The valve cylinder also movably receives at least one main valve member that is movable by a control member. When the servo-control has a plurality of hydraulic valves allocated to respective actuator cylinders, the control member engages each of the main valve members of the hydraulic valves jointly, and is itself movable by the pilot using flight controls to move each of the main valve members jointly.

The control member, possibly arranged as a connecting rod, may for example be movable by said force transmission linkage when using manual flight controls. Also by way of example, the control member may be moved by a said actuator, such as an electric motor, when using automatic flight controls.

The main valve member provides first fluid flow channels through the hydraulic valve between the first ducts and the second ducts.

Depending on the position of the main valve member as controlled by the control member, the admission duct and the discharge duct are put into fluid flow communication selectively with one or the other of the second ducts.

As a result, moving the main valve member by means of the control member complying with the flight controls operated by the pilot serves to direct or to vary the flow fluid through the actuator cylinder associated with the hydraulic valve. Thus, the hydraulic valve makes it possible to adjust the relative movement between the actuator cylinder and the rod it receives in one or the other of the directions in which the rod can move inside the actuator cylinder.

In this context, consideration is generally given to a normal situation in which the servo-control is operating normally without any failure in the or one of the hydraulic valves included in the servo-control. However, such a failure can be observed in particular in the event of the main valve member seizing inside the valve cylinder of one of the hydraulic valves.

For a servo-control having a hydraulic actuator with a single actuator cylinder, a malfunction of the servo-control or of the fluid feed circuit prevents the blades being feathered by means of the servo-control. The pilot can nevertheless feather the blades by forcing the rod to move by means of the force transmission linkage. Nevertheless, it should be understood that such forced movement of the rod is uncomfortable for the pilot.

Incorporating a plurality of actuator cylinders in the hydraulic actuator makes it possible to make the operation of the servo-control safer, in particular in the event of a malfunction of one of the hydraulic circuits feeding fluid to one or the other of the actuator cylinders, or indeed in the event of a malfunction of one of the actuator cylinders.

There thus arises the problem of making safe, reliable, and accurate the operation of the servo-control. More particularly, in the event of the main valve member of the or one of the hydraulic valves seizing, that must not cause the hydraulic actuator to be blocked, nor must it cause it to malfunction by allowing uncontrolled movement of the rod(s) co-operating with the respective actuator cylinder(s).

That is why, in order to make the operation of servo-controls more reliable, it is known to provide double hydraulic valves. A double hydraulic valve includes an emergency valve member mounted inside the valve cylinder, being interposed between the main valve member and the valve cylinder. The emergency valve member has second channels communicating respectively with the first channels of the main valve member.

More particularly, the main cylinder member is guided to move inside the emergency valve member, which is itself potentially movable inside the valve cylinder. In the nominal position of the hydraulic valve without any seizing of the main valve member, the emergency valve member is held in a predefined position inside the valve cylinder by positioning means. Such positioning means may in particular be of the elastically deformable type that bear in opposite directions against the valve cylinder and against the emergency valve member.

In the event of the main valve member seizing inside the emergency valve member, the emergency valve member is entrained by friction by the main valve member against forces exerted by the elastically deformable means against the emergency valve member.

Such arrangements make it possible to keep the hydraulic valve in operation in spite of the main valve member seizing.

Nevertheless, in the event of the main valve member seizing, the operation of the hydraulic valve that is obtained complies only partially with the flight commands issued by the pilot.

It can be seen that the extra reliability in operation of the hydraulic valve could still be improved further. The above-mentioned arrangement of the hydraulic valve serves essentially to avoid the hydraulic valve becoming blocked in the event of the main valve member seizing in the or one of the hydraulic valves included in the servo-control.

With a hydraulic actuator having multiple actuator cylinders, proper control of the operation of the hydraulic actuator can be achieved by one of the hydraulic valves in the event of the main valve member in the other hydraulic valve seizing. It is possible that proper control could be obtained by the failed hydraulic valve in the event of the main valve member, when seized, is in an appropriate position inside the emergency valve member; however its position is randomly uncertain.

As a result, in order to obtain good operation of the hydraulic actuator in the event of one of the hydraulic valves malfunctioning, it is desirable for seizing of the main valve member in one of the hydraulic valves never to constitute an obstacle that prevents proper operation of the other hydraulic valve.

Furthermore, the use of positioning means of the elastically deformable type for holding the emergency valve member inside the valve cylinder in said predefined position needs to be improved.

In the event of the main valve member seizing, it is desirable for the hydraulic valve to be controllable using forces that are small, so as to improve the comfort of a human pilot operating flight controls manually and so as to avoid overdimensioning said actuator when using automatic flight controls.

For a description of a technological environment close to the present invention, reference may be made to Document FR 2 916 492 (Eurocopter France), which describes a device for detecting seizing of a double hydraulic valve in a servo-control for a hydraulic actuator having two double-acting actuator cylinders for feathering the blades of a rotorcraft rotor.

BRIEF SUMMARY OF THE INVENTION

The object of the present invention is to provide a double hydraulic valve for a servo-control for feathering the blades of a rotorcraft rotor by modifying their angle of incidence by varying their pitch collectively or cyclically, and also to provide a method of using said hydraulic valve.

Such a servo-control comprises a hydraulic actuator having at least one double-acting actuator cylinder, each actuator cylinder being fed with fluid via a hydraulic valve that is individually associated therewith, as described above.

In the context of an arrangement of such a servo-control, the present invention seeks essentially to respond to the following unusual results and observed needs, whether considered in isolation or in combination:

Preventing malfunction of the hydraulic actuator in the event of the main valve member seizing in one of the hydraulic valves fitted to a hydraulic actuator having multiple actuator cylinders and forming part of the servo-control.

Stabilizing the relative position between the emergency valve member and the main valve member in a hydraulic valve fitted to a hydraulic actuator forming part of the servo-control, said hydraulic actuator essentially being an actuator with a single actuator cylinder or an actuator with multiple actuator cylinders.

In the event of the main valve member seizing in one of the hydraulic valves fitted to a hydraulic actuator having multiple valve cylinders forming part of the servo-control, allowing the other hydraulic valve associated with another actuator cylinder of the hydraulic actuator to operate completely freely.

Obtaining reliable and accurate operation of the hydraulic valve(s) fitted to a hydraulic actuator that may equally well be a single-cylinder actuator or a multiple-cylinder actuator, while limiting the forces to be delivered by a control member governing their operation in compliance with flight commands generated by a pilot of the rotorcraft.

Enabling a pilot to feather the blades comfortably by means of manual control members in the event of the main valve member seizing in the hydraulic valve fitted to a hydraulic actuator having a single actuator cylinder.

Furthermore, it should not be forgotten that the structure of the hydraulic valve(s) should be as simple as possible and as light as possible. Such a constraint comes within the context of obtaining the hydraulic valve(s) at low cost while limiting their weight and their overall size, given that they are to be installed on board a rotorcraft where they need to be as light as possible.

The hydraulic valve of the present invention is a double hydraulic valve included in a servo-control for feathering the blades of a rotorcraft rotor.

The hydraulic valve of the present invention comprises a first cylinder, referred to as a valve cylinder, having first ducts, referred to as A ducts. The A ducts are dedicated to providing a hydraulic junction between the hydraulic valve and a source of fluid under pressure. The A ducts comprise at least an admission duct referred to as an admission A duct, the admission A duct providing admission of fluid from the outside to the inside of the hydraulic valve. The A duct also includes at least one discharge duct, referred to as a discharge A duct. The discharge A duct serves to discharge fluid out from the hydraulic valve.

The valve cylinder also has second ducts, referred to as B ducts. The B ducts are dedicated to providing hydraulic connection between the hydraulic valve and a second cylinder, referred to as an actuator cylinder, forming part of a hydraulic actuator of the servo-control. The B ducts comprise a pair of B ducts enabling fluid to flow between the inside and the outside of the hydraulic valve.

The hydraulic valve of the present invention also has a main valve member movably mounted inside the valve cylinder. The main valve member is controllable by a control member and includes first channels, referred to as A channels, dedicated to allowing fluid to flow through the hydraulic valve between the A ducts and the B ducts. The admission A ducts and the discharge A ducts are put into fluid flow communication via the A channels selectively with one or the other of the B ducts depending on the respective positions of the main valve member inside the valve cylinder.

The hydraulic valve of the present invention also includes an emergency valve member interposed between the valve cylinder and the main valve member. The emergency valve member movably houses the main valve member and is itself movably mounted inside the valve cylinder. The emergency valve member provides second channels referred to as B channels. The B channels are dedicated to allowing fluid to flow between the A channels and either the A ducts or the B ducts, selectively depending on the respective positions of the main valve member.

The hydraulic valve of the present invention also includes positioning means for positioning the emergency valve member in a predefined position inside the valve cylinder. In said predefined position of the emergency valve member, the A channels and the B channels are in fluid flow communication in pairs.

Said positioning means make use at least of elastically deformable means bearing against the valve cylinder. The emergency valve member is authorized to move inside the valve cylinder together with the main valve member under the effect of friction drive of the emergency valve member being entrained by friction from the main valve member in the event of it seizing inside the emergency valve member, this movement being against thrust exerted by the elastically deformable means.

According to the present invention, said positioning means are means for blocking the emergency valve member relative to the valve cylinder by a pin that is movably mounted in the valve cylinder. The pin co-operates by sliding thrust engagement with a cavity in the emergency valve member and it is movably mounted between an engaged position and a disengaged position.

In the engaged position, a head of the pin is received in the cavity under the effect of the thrust exerted against the pin by the elastically deformable means. In the disengaged position said head of the pin is totally disengaged from the cavity by mover means for moving the pin against the thrust exerted on the pin by the elastically deformable means.

Operation of the mover means depends on relative movement between the emergency valve member and the valve cylinder serving to release at least in part said cavity as a result of the head of the pin sliding inside the cavity.

In the normal operation situation of the hydraulic valve, the emergency valve member is held firmly blocked in said predefined position by the pin having its head received in the cavity. Said normal situation is a situation of the hydraulic valve in which no seizing is observed of the main valve member inside the emergency valve member.

With the pin in the engaged position, the main valve member is free to move inside the emergency valve member, being movable by the control member. The emergency valve member is firmly blocked inside the valve cylinder while the pin is held engaged in the engagement position in said cavity by the elastically deformable means exerting axial thrust on the pin.

It can be understood that said axial thrust is exerted on the pin by the elastically deformable means in the general axial direction in which the pin extends, corresponding to the direction in which the pin is movable inside the hydraulic valve.

It should also be understood that the mechanical connection via the pin between the emergency valve member and the valve cylinder implies that the axial thrust exerted on the pin by the elastically deformable means acts transversely relative to the axis along which the valve members are movable inside the cylinder, without prejudice to whether such movement is movement in translation or in rotation.

In a situation in which the main valve member is seized inside the emergency valve member, relative movement between the valve cylinder and the emergency valve member is authorized by relative sliding between the head of the pin and the cavity against the thrust exerted on the pin by the elastically deformable means.

More particularly, the emergency valve member is caused to move by being entrained by friction from the main valve member when it is in a seized situation. A movement of the emergency member, even if very small, gives rise to the head of the pin pressing against the walls of the cavity, thereby initiating movement of the pin towards the disengaged position. Such initiation of movement of the pin is limited in travel and it is the result of the head of the pin sliding against the wall of the cavity.

The relative movement between the head of the pin and the cavity causes the pin to move from its engaged position towards an intermediate position of the pin. The relative movement between the head of the pin and the cavity, even if limited in stroke to a small-amplitude initiation of a movement of the pin authorizes said relative movement between the emergency valve member and the valve cylinder causing the mover means to be operated so as to cause the pin, to pass from the engaged position, and more particularly from the intermediate position, towards the disengaged position.

The passage of the pin into the disengaged position is independent of the amplitude of the relative movement between the main valve member and the emergency valve member. The pin remains in the intermediate position for a very short duration because the mover means begin to operate as soon as relative movement between the main valve member and the emergency valve member is initiated.

Operation of the mover means causes the head of the pin to be withdrawn completely from the cavity, thereby releasing the emergency valve member from being blocked inside the valve cylinder. Once in a situation where it is completely free to move, the emergency valve member is subjected to no constraint opposing its movement inside the valve cylinder, other than the friction forces between the emergency valve member and the valve cylinder.

It should be observed at this stage of the description that operation of the mover means may potentially be caused as a result of a command generated by means for detecting the initiation of relative movement between the emergency valve member and the valve cylinder.

Continuing the approach of the present invention, it is advantageously proposed to use the fluid admitted into the hydraulic valve to provide the mechanical power needed for moving the pin away from its engaged position towards its disengaged position.

To this end, an advantageous embodiment is proposed in which the mover means for moving the pin are means for applying fluid thrust to the pin, which pin is provided with a piston having applied thereagainst the fluid that is admitted under pressure into the inside of the hydraulic valve.

More particularly, the pin is movably received in a chamber of the valve cylinder and is arranged as a plunger for closing a first fluid passage referred to as a C channel. Said C channel opens out into the chamber via the cavity and is in fluid flow communication with one of any one of said A ducts and B ducts. At least a partial setback in the cavity allows fluid to be admitted into the inside of the chamber from the C channel.

The head of the pin releasing the cavity at least in part leads to operation of the mover means by the pin being thrust towards the disengaged position by the fluid flowing under pressure inside the valve.

In the event of the main valve member seizing and as a result of the movement of the pin being initiated, the fluid admitted into the inside of the chamber through the cavity that has been released at least in part from the head causes the head to be pushed back and causes the pin to pass from the partially-engaged position of the head inside the cavity while in the intermediate position of the pin towards the disengaged position of the pin in which it is completely freed from the engagement exerted by the cavity.

The admission of fluid into the inside of the chamber makes it impossible to reverse the passage of the pin from the engaged position to the disengaged position.

It should clearly be understood that the thrust capacity of the elastically deformable means on the pin is selected to be less than the capacity of the mover means to move the pin, and more specifically less than the capacity of the fluid admitted under pressure into the inside of the chamber and coming from the C channel to exert thrust on the pin.

It can also be understood at this stage of the description that the delivery of fluid to the pin may potentially be performed from any point where fluid can be taken from any of the A ducts and the B ducts in order to be directed to the chamber.

Nevertheless, the C channel is preferably in fluid flow communication with the admission A duct in order to optimize the thrust force exerted on the pin by the fluid brought under pressure from the fluid source.

In an advantageous embodiment, the hydraulic valve has means for establishing fluid flow communication between all of the A ducts and the B ducts in the disengaged position of the pin.

Establishing fluid flow communication between the A ducts and the B ducts serves spontaneously and without any other external intervention to place the chamber at a fluid pressure that corresponds to the pressure of the fluid discharged from the hydraulic valve via the discharge duct.

In the context of the valve being incorporated in said servo-control for the purpose of controlling the flow of fluid in an actuator cylinder of the hydraulic actuator, the fluid flowing in the actuator cylinder is at identical pressures at the top and at the bottom of the actuator. Such a pressure corresponds to the pressure of the fluid discharged from the hydraulic valve to a fluid source that is at a pressure lower than the pressure of the fluid admitted into the hydraulic valve from the fluid source, in particular by putting the discharge A ducts to the fluid source at atmospheric pressure, or by discharging fluid to the source of fluid at a pressure that is significantly lower than the pressure of the fluid taken from the fluid source to the hydraulic valve.

In a particular embodiment, the valve cylinder has second fluid passages, referred to as D channels. Said D channels are fluid passages respectively for a first D channel between the chamber and the admission A duct, for a second D channel between the chamber and the discharge A duct, for a third D channel between the chamber and one of the B ducts, and for a fourth D channel between the chamber and the other one of the B channels. The outlet to the chamber of the D channels are closed off jointly by the piston in the engaged position of the pin and they are uncovered by the piston in the disengaged position of the pin.

The disengagement of the outlet into the chamber of the D channels may potentially take place jointly or progressively going from one of said ducts to another, whether considered individually or in pairs per group of ducts formed respectively by the A ducts and the B ducts.

By way of example, in one embodiment, the D channels open out into the chamber in a common radial plane considered relative to the axial travel direction of the pin inside the chamber. These arrangements are such that fluid flow communication is established between all of the A ducts and the B ducts simultaneously.

Also by way of example and in another embodiment, the D channels open out into the chamber in different radial planes relative to the axial travel direction of the pin inside the chamber. These arrangements are such that fluid flow communication is established progressively between the A ducts and the B ducts, depending on the axial position of the pin as it moves towards the disengaged position.

Preferably, the chamber is in fluid flow communication with the discharge A duct via a third fluid passage referred to as the E channel. Said E channel opening out into any position of the pin upstream from the piston in the travel direction of the pin from the engaged position towards the disengaged position. The chamber is continuously fed with fluid from the discharge A duct in the engaged position of the pin. These arrangements make it possible to avoid excessive variation in the pressure inside the chamber when admitting fluid into the chamber from the admission A duct.

In the context of the valve being incorporated in said servo-control to control the flow of fluid in an actuator cylinder of a hydraulic actuator forming part of said servo-control, the fluid admitted into the chamber in the engaged position of the pin is at a pressure corresponding to the pressure of the fluid discharged from the hydraulic valve to a fluid source at atmospheric pressure or at least at a pressure that is lower than the pressure of the fluid admitted to the hydraulic valve from the fluid source.

As a result, the pressure of the fluid inside the chamber in the engaged position of the pin cannot prevent thrust being exerted against the pin by the fluid admitted into the chamber from the admission duct.

It should also be observed that said continuous feed of fluid to the chamber in the engaged position of the pin provides lubrication inside the chamber, which is favorable to movement of the piston, thereby serving to avoid the pin seizing inside the chamber.

The E channel preferably includes a section constriction to provide an escape for fluid, if any, that has been admitted in unwanted manner to the inside of the chamber in the event of a small fluid leak between the head and the cavity forming the outlet of the C channel.

The hydraulic valve preferably has means for holding the pin in the disengaged position independently of any interruption in the operation of the mover means. Such arrangements are particularly useful when it is desired to place the chamber at a pressure equivalent to the pressure of the fluid discharged to the fluid source.

More particularly, the holder means make it possible to avoid conserving active operation of the mover means in order to hold the pin in the disengaged position. Once the pin has been moved by the mover means away from the engaged position towards the disengaged position, the holder means are operated, preferably spontaneously, in order themselves to prevent unwanted return of the pin from the disengaged position to the engaged position.

Such arrangements are particularly useful when it is desired for the A ducts and the B ducts to be in fluid flow communication in the disengaged position of the pin, and consequently in the preferred situation where the chamber is placed at the pressure of the fluid that exists in the discharge duct. Since putting the A ducts into fluid flow communication with the B ducts leads to a drop of pressure inside the chamber, it is preferable to reinforce the holding of the pin in the disengaged position by specific holder means.

In an advantageous embodiment enabling the structure of the valve to be simplified, the holder means are formed by said elastically deformable means being arranged as at least one spring blade.

Said spring blade(s) is/are fastened to the valve cylinder and engaged axially in both directions with the pin. The two directions should be considered along the two directions in which the pin can move axially. The spring blade(s) exert(s) axial thrust against the pin in the engaged position and axial traction on the pin in the disengaged position as a result of the deformation of the spring blade(s) caused by the pin passing into the disengaged position.

In another embodiment of the holder means, they are of the resilient engagement type and comprise an elastically deformable clip co-operating with a housing. The clip and the housing are arranged respectively one in or on the valve cylinder and the other in or on the pin.

It should clearly be understood that the clip and the housing are arranged respectively in or on the valve cylinder and in or on the pin, without prejudice to which one of the valve cylinder and the pin has the clip or the housing.

In an embodiment, the hydraulic valve is of the slide type. Under such circumstances, the main valve member and the emergency valve member are mounted to move in translation inside the valve cylinder.

In another embodiment, the hydraulic valve is of the rotary type. Under such circumstances, the main valve member and the emergency valve member are mounted to move angularly inside the valve cylinder.

The bearing surface of the head of the pin inside of the cavity may equally well be a spherical bearing surface or a conical bearing surface.

More particularly, the bearing surface of the head of the pin is potentially of any shape, providing said shape encourages the pin to slide from the engaged position towards the intermediate position in which the head is partially disengaged from the cavity under the effect of the relative movement between the emergency valve member and the main valve member.

In a particular embodiment, the operation of the mover means depends on detector means for detecting relative movement between the main valve member and the emergency valve member. By way of example, such detector means are described in Document FR 2 916 492.

In the context of incorporating the valve in said servo-control in order to control fluid flow in an actuator cylinder of a hydraulic actuator forming part of the servo-control, the hydraulic valve may be fitted with such detector means suitable for generating an alarm signal. Such detector means may advantageously be used to generate an order for operating the mover means.

Such provisions make it possible in particular for the mover means to be selected from mover means of various types. More particularly, the mover means may for example be of the electromagnetic, mechanical, pneumatic, or chemical type.

The present invention also provides a servo-control for feathering the blades of a rotorcraft rotor. Said servo-control includes at least one double-acting hydraulic actuator with at least one actuator cylinder, and at least one hydraulic valve of the present invention as described above.

In a specific embodiment, the servo-control comprises at least one hydraulic actuator having a plurality of double-acting actuator cylinders, each of the actuator cylinders being fed with fluid by a hydraulic valve associated therewith.

In an embodiment of a servo-control of the present invention comprising at least one double-acting hydraulic actuator with a double actuator cylinder, each actuator cylinder of the hydraulic actuator is in fluid flow communication with a hydraulic valve associated therewith. The B ducts of each of the hydraulic valves are in fluid flow communication with a respective actuator cylinder.

One of the B ducts of a first hydraulic valve is in fluid flow communication with a first top passage of a first actuator cylinder. The other B duct of the first hydraulic valve is in fluid flow communication with a first bottom passage of the first actuator cylinder.

One of the B ducts of a second hydraulic valve is in fluid flow communication with a second top passage of a second actuator cylinder. The other B duct of the second hydraulic valve is in fluid flow communication with a second bottom passage of the second actuator cylinder.

The main valve members of each of the hydraulic valves are jointly engaged with a common control member that, when operated, governs the distribution of fluid through each of the two hydraulic valves.

With the pins in each of the hydraulic valves in the engaged position, the first actuator cylinder and the second actuator cylinder are fed with fluid as determined by the hydraulic valves respectively associated therewith. The hydraulic valves control the flow of fluid inside the actuator cylinders in compliance with the joint movement of the main valve members acting via the common mover member. The hydraulic valves cause relative movement between the actuator cylinders and at least one rod housed therein either jointly or individually, respectively depending on the flow directions of the fluid delivered by the hydraulic valves to the insides of the actuator cylinders.

It can be understood, as mentioned below, that a single rod may be housed jointly by the actuator cylinders if the actuator cylinders are mounted in tandem, or that the rods of a plurality of rods may be housed in respective actuator cylinders when the actuator cylinders are mounted in parallel.

The seizing of any of the main valve members of the hydraulic valves moves the pin in the hydraulic valve in which the main valve member has seized. The movement of the pin completely releases the emergency valve member to move freely, preferably by allowing fluid to flow between the A ducts and the B ducts.

The seizing of any of the main valve member of the hydraulic valves inhibits selective distribution of fluid to the actuator cylinders via a hydraulic valve in which the main valve member has seized. Said inhibition does not constitute an obstacle to the emergency valve member moving inside the valve cylinder, and consequently does not constitute an obstacle to the main valve member being moved by the mover member.

Seizing of the main valve member in a first hydraulic valve does not constitute an obstacle to the mover member freely moving the main valve member of the second hydraulic valve, and does not constitute an obstacle to freedom of relative movement between the rod(s) and the actuator cylinders.

Relative movement between the rod(s) and the actuator cylinders continues to be controlled by the other hydraulic valve selectively distributing fluid to the inside of the actuator cylinder associated therewith.

In one embodiment, the actuator cylinders are mounted in tandem, jointly housing a common rod.

In another embodiment, the actuator cylinders are mounted in parallel, the actuator cylinders housing respective rods that are mechanically connected together.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

Figure 1:
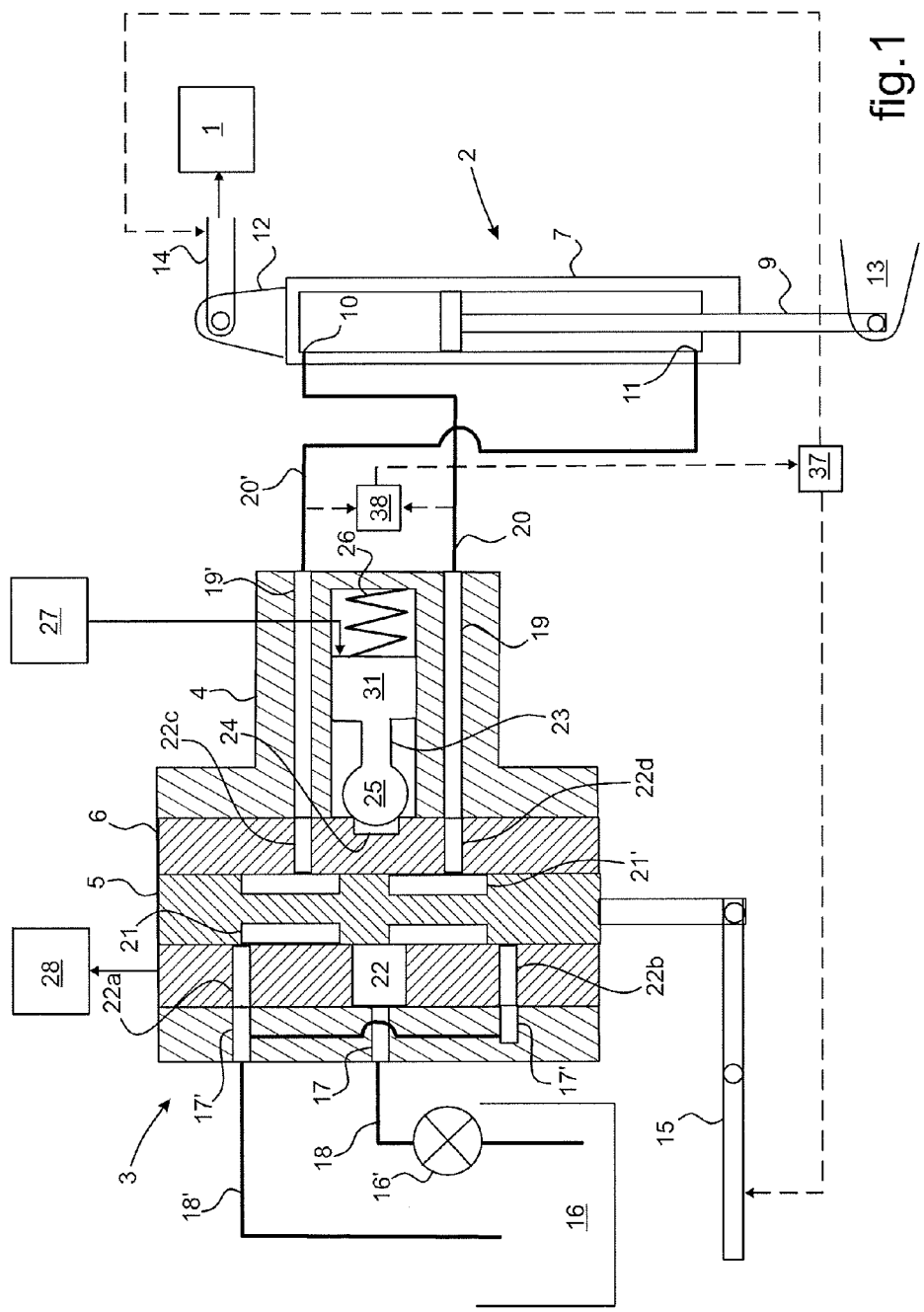
FIG. 1 shows a servo-control for feathering the blades of a rotorcraft rotor, the servo-control incorporating a hydraulic valve in accordance with the present invention.

In FIGS. 1 to 4, a servo-control is arranged to feather the blades 1 of a main rotor of a rotorcraft, the rotor being of substantially vertical axis.

The servo-control conventionally associates at least one hydraulic actuator 2 of operation governed by at least one hydraulic valve 3, 3' comprising a valve cylinder 4 housing a main valve member 5 and an emergency valve member 6.

The hydraulic actuator 2 comprises at least one actuator cylinder 7, 8 housing a rod 9 that is axially movable along the general direction in which the actuator cylinder 7, 8 extends. Each actuator cylinder 7, 8 is a double-acting cylinder, having for this purpose a top passage 10 and a bottom passage 11 to allow a fluid to flow inside the actuator cylinder(s) 7, 8.

The fluid is brought under pressure to the actuator cylinder(s) 7, 8 and is potentially admitted into the actuator cylinder(s) 7, 8 either via the top passage 10 or via the bottom passage 11. Conversely, fluid is discharged from the actuator cylinder(s) 7, 8 through the bottom passage 11 or through the top passage 10.

The flow of fluid inside the actuator cylinder(s) 7, 8 causes the rod 9 to move relative to the actuator cylinder(s) 7, 8, which rod is slidably mounted inside at least one of the actuator cylinder(s) 7, 8 to move in two opposite directions. Relative movement between the actuator cylinder(s) 7, 8 and the rod 9 is used for feathering the blades 1.

To this end, the actuator cylinder(s) 7, 8 and the rod(s) 9 of the hydraulic actuator(s) 2 are each provided with respective attachment members 12, 13 enabling them to be engaged respectively on a structure of the rotorcraft and/or on a blade feathering member 14.

Figure 2:
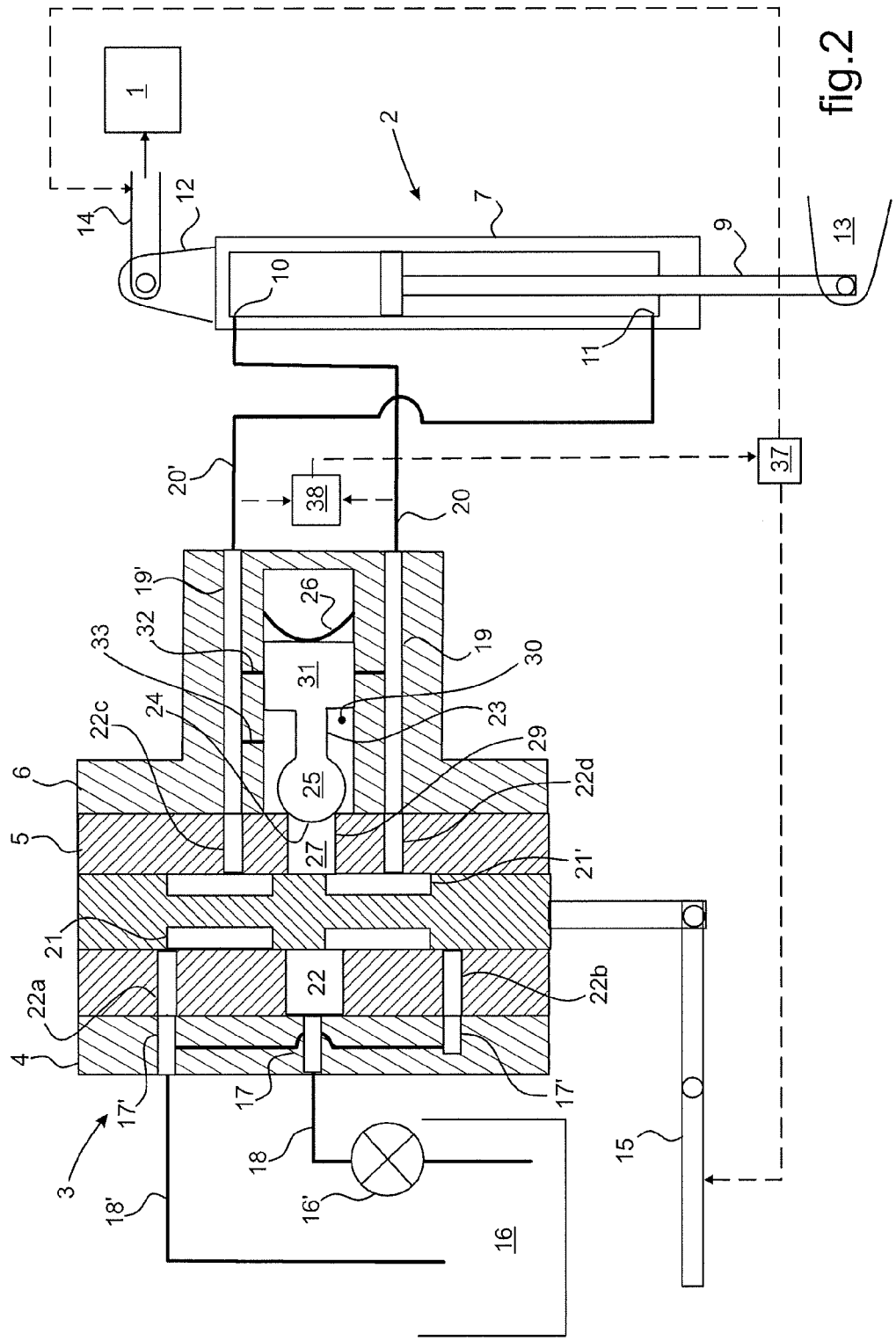
FIGS. 2 to 4 illustrate respective embodiments of a servo-control incorporating at least one hydraulic valve in accordance with the present invention.
Figure 3:
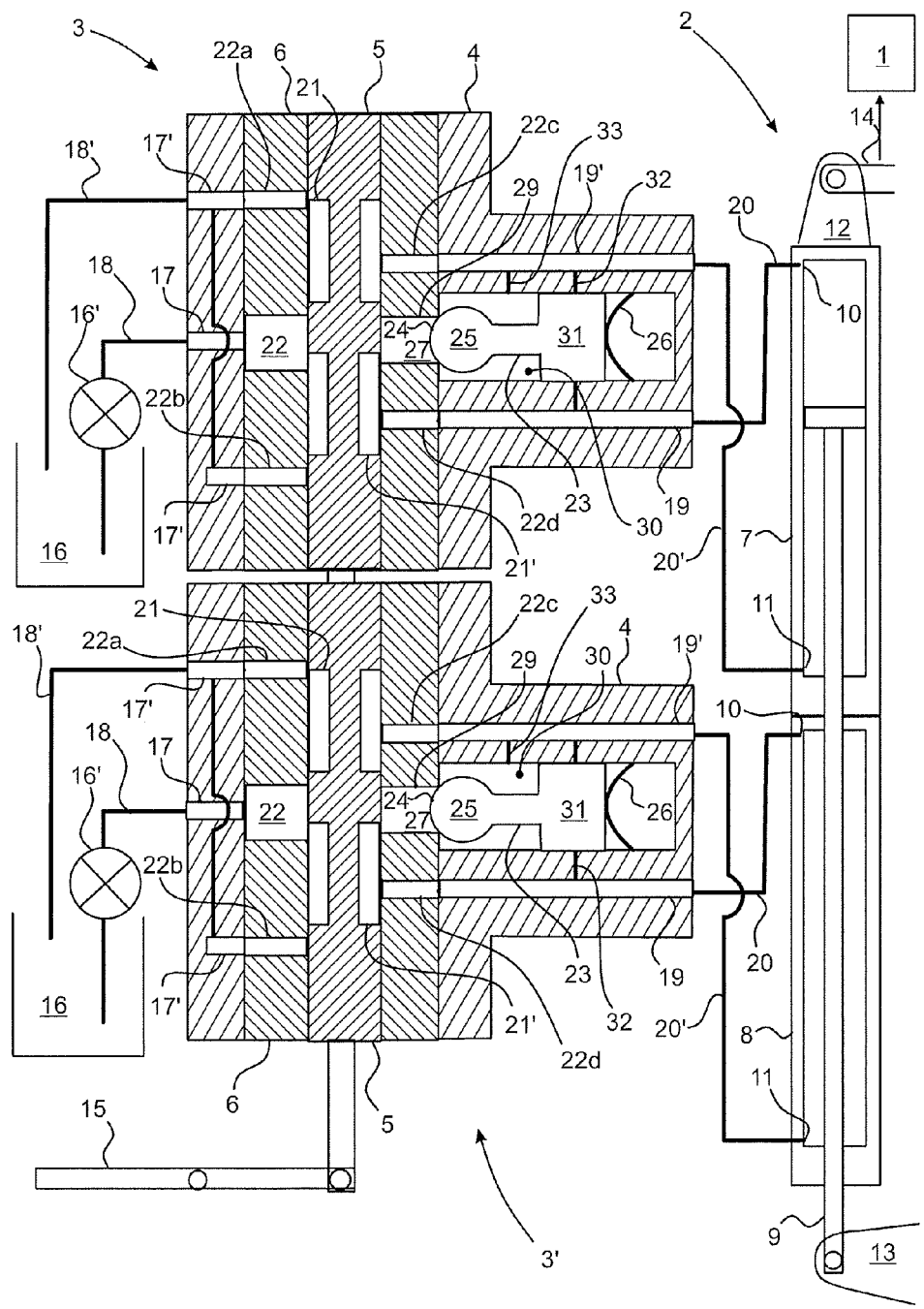

In FIGS. 1 to 3, the rod 9 has an attachment member 13 for attaching to the structure of the rotorcraft and the actuator cylinder 7 is fitted with an attachment member 12 for attaching to the blade feathering member 14.

Figure 4:
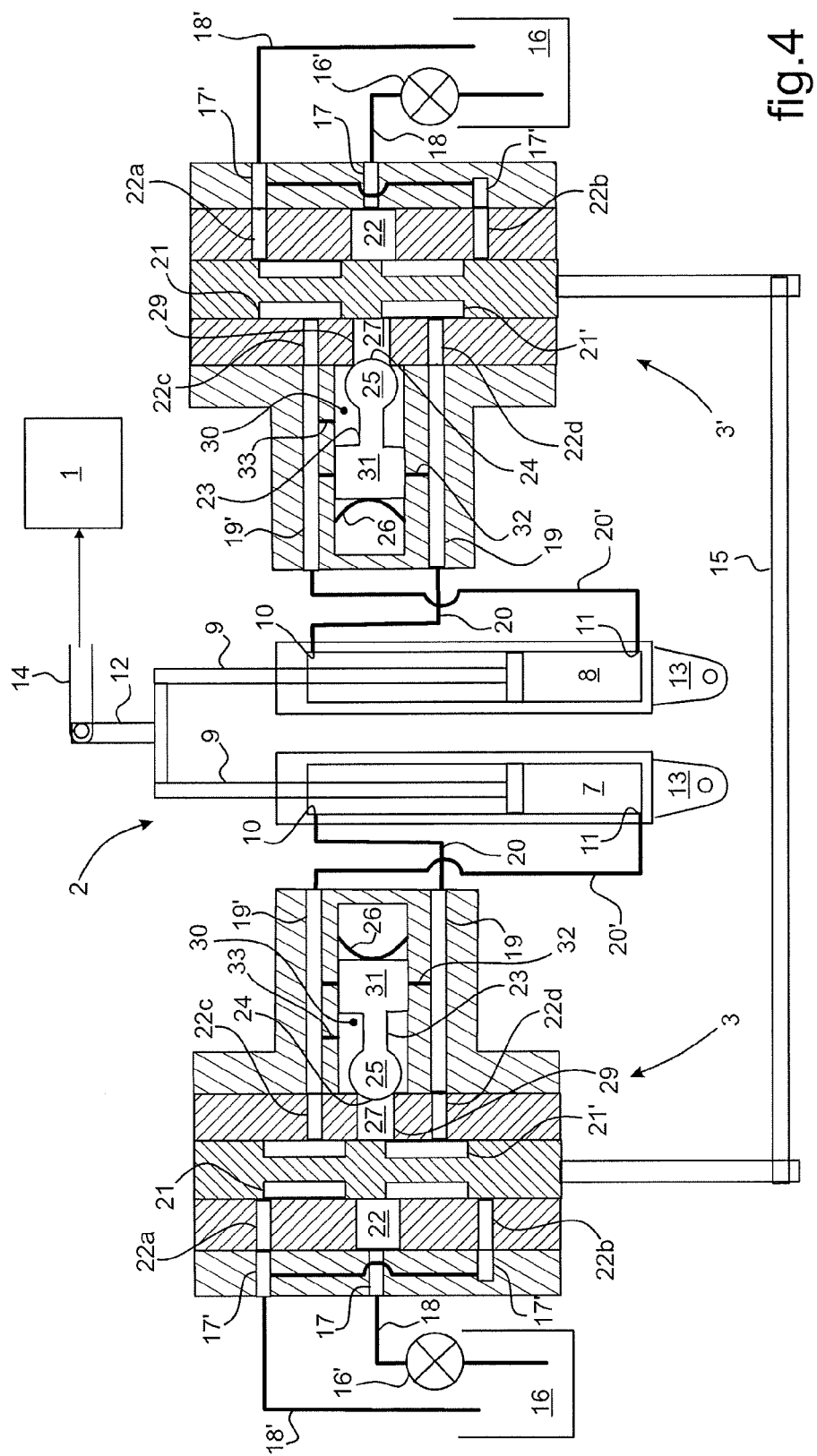

In FIG. 4, the rods 9 co-operating with respective actuator cylinders 7, 8 are jointly fitted with a common attachment member 12 for attaching to the blade feathering member 14. The actuator cylinders 7, 8 are fitted with respective attachment members 13 for attaching to the structure of the rotorcraft.

Furthermore, in FIGS. 1 and 2, the servo-control has a hydraulic actuator 2 with a single actuator cylinder 7. In FIG. 3, the servo-control has a hydraulic actuator 2 with two actuator cylinders 7, 8 connected in tandem and housing a common rod 9. In FIG. 4, the servo-control has a hydraulic actuator 2 with two actuator cylinders 7, 8 arranged in parallel, with their respective rods 9 being operated jointly and being connected together by means of the common attachment member 12 with which they are fitted.

In general in FIGS. 1 to 4, the flow of fluid through at least one actuator cylinder 7, 8 is governed by a hydraulic valve 3, 3' that is associated therewith.

The operation of at least one hydraulic valve 3, 3' depends on a control member 15 that is operable by a pilot of the rotorcraft, which pilot may be a human or an autopilot. The control member 15 is engaged on the main valve member 5 of at least one hydraulic valve 3, 3' in order to govern the flow of fluid between said at least one actuator cylinder 7, 8 and a fluid source 16.

The valve cylinder 4 of a hydraulic valve 3, 3' of the invention has A ducts 17, 17' dedicated to making a hydraulic connection between the hydraulic valve 3, 3' and the fluid source 16. A pipe referred to as the "go" A pipe 18 acts via a pump 16' to convey the fluid under pressure from the fluid source 16 to an admission A duct 17 of the hydraulic valve 3, 3'. Another pipe, referred to as the "return" A pipe 18' conveys fluid under pressure from discharge A ducts 17' of the hydraulic valve 3, 3' to the fluid source 16.

The valve cylinder 4 of a hydraulic valve 3, 3' of the invention also has B ducts 19, 19' for providing a hydraulic connection between the hydraulic valve 3, 3' and an actuator cylinder 7, 8 with which it is associated. The B ducts are in hydraulic communication via pipes 20, 20', referred to as "B" pipes, respectively with the top and bottom passages 10, 11 of the hydraulic cylinder 7, 8 with which the hydraulic valve 3, 3' is associated.

There can also be seen a first B pipe referred to as a "top" B pipe 20 and a second B pipe referred to as a "bottom" B pipe 20', the top and bottom B pipes 20 and 20' being in fluid flow communication respectively with the top passage 10 and the bottom passage 11 of the actuator cylinder 7, 8 with which the B pipes are associated.

The main valve member 5 of a hydraulic valve 3, 3' is mounted to slide inside the emergency valve member 6, which is itself mounted to slide inside the valve cylinder 4.

In the event of the main valve member 5 seizing inside the emergency valve member 6, then the main valve member 5 entrains the emergency valve 6 by friction so that it slides inside the valve cylinder 4 in order to keep the hydraulic valve 3, 3' in operation.

The main valve member 5 has first channels 21, 21' that are referred to as "A" channels, being dedicated to conveying fluid through the hydraulic valve 3, 3' between the A ducts 17, 17' and the B ducts 19, 19'.

In the embodiment shown, the A channels 21, 21' are formed by respective enclosures opening out to the periphery of the main valve member 5 via the recess in the emergency valve member 6 that houses the main valve member 5.

Furthermore, the emergency valve member 6 has second channels 22-22d (22, 22a, 22b, 22c, 22d) referred to as "B" channels. The B channels 22-22d are for conveying fluid flow between the A ducts 17, 17' and the B ducts 19, 19' via the A channels 21, 21'. The flow of fluid between the A ducts 17, 17' and the B ducts 19, 19' is obtained selectively depending on the various respective positions of the main valve member 5 operated by the control member 15.

Other than in the event of the main valve member 5 seizing, the emergency valve member 6 is held in a predefined position inside the valve cylinder 4. For this purpose, the emergency valve member 6 is blocked relative to the valve cylinder 4 by means of a pin 23. The pin 23 is mounted to move axially inside the valve cylinder 4 and it co-operates by sliding thrust engagement with a cavity 24 formed in the emergency valve member 6.

The direction in which the pin 23 moves axially extends transversely, and more specifically orthogonally, relative to the axis along which the emergency valve member 6 moves so that the forced blocking the emergency valve member 6 relative to the valve cylinder 4 is optimized.

More particularly, the pin 23 has a head 25 of spherical or analogous shape providing said sliding thrust engagement between the head 25 and the inside of the cavity 24. The pin 23 is held in the engaged position by close co-operation between the head 25 and the cavity 24, as shown in FIGS. 1 to 5.

The pin 23 is held in the engaged position under the effect of thrust exerted by elastically deformable means 26 thrusting in opposite directions against the valve cylinder 4 and against the pin 23. Said opposite thrust acts axially along the general axis along which the pin 23 extends and moves inside the valve cylinder 4.

In the event of the main valve member 5 seizing inside the emergency valve member 6, the emergency valve member 6 being entrained by the main valve member 5 causes the head 25 to slide inside the cavity 24.

Such relative sliding between the head 25 and the cavity 24 is representative of the main valve member 5 seizing inside the emergency valve member 6 and it takes place at a predetermined force threshold for relative movement between the emergency valve member 6 and the valve cylinder 4.

Said force threshold is predetermined depending on the friction forces between the emergency valve member 6 and the valve cylinder 4, depending on the thrust force exerted against the pin 23 by the elastically deformable means 26, and depending on the surface state of the shape of the sliding thrust surface of the head 25 against the cavity 24, said thrust surface preferably being a spherical bearing surface.

Once movement of the emergency valve member 6 has been initiated, mover means 27 for moving the pin 23 are put into operation. The pin 23 is moved inside the valve cylinder 4 from the engaged position to a disengaged position in which the pin 23 is completely released from any engagement with the cavity 24.

Figure 9:
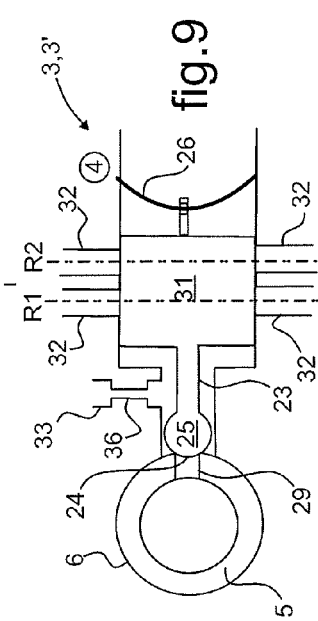
FIGS. 9 and 10 show respective variant embodiments of a hydraulic valve in accordance with the present invention.
Figure 10:
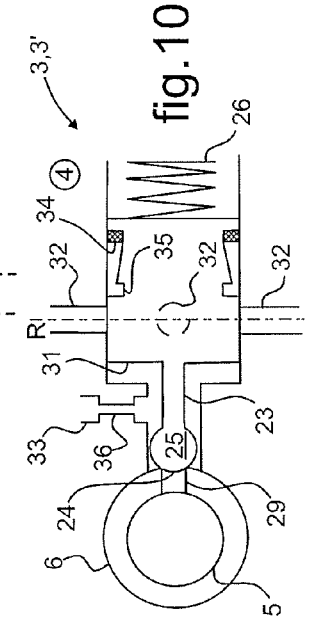

In FIGS. 1 and 10, the pin 23 is held in the engaged position inside the cavity 24 by elastically deformable means 26 formed by a compression spring, for example. In FIGS. 2 to 9, the pin 23 is held in the engaged position inside the cavity 24 by elastically deformable means 26 formed by spring blade(s).

In FIG. 1, a movement of the emergency valve member 6 inside the valve cylinder 4 gives rise to relative sliding between the head 25 and the cavity 24, and this movement is detected by detector means 28 that cause the mover means 27 to be put into operation.

By way of example, the detector means 28 are means for detecting the beginning of relative movement between the emergency valve member 6 and the valve cylinder 4 under the effect of the main valve member 5 seizing and entraining the emergency valve member 6 by friction. The mover means 27 may potentially be any type of means suitable for moving the pin 23, e.g. means of the mechanical type, of the electromagnetic type, of the pneumatic type, or of the chemical type.

In FIGS. 2 to 10, advantage is advantageously taken of the flow of fluid under pressure inside the valve to constitute the mover means 27. More particularly, the cavity 24 is formed at the outlet of a channel 29 referred to as a "C" channel, forming a first fluid passage between any of the A ducts 17, 17' or B ducts 19, 19' and a chamber 30 arranged inside the valve cylinder 4. The pin 23 has a piston 31 and said chamber 30 is a chamber for guiding the pin 23 in sliding towards the disengaged position, with the sliding of the pin 23 being caused under the effect of the fluid under pressure being admitted into the inside of the chamber 30 via the C channel 29, and preferably via the A channels 21, 21' in order to simplify the structural layout of the hydraulic valve 3, 3'.

Figure 5:
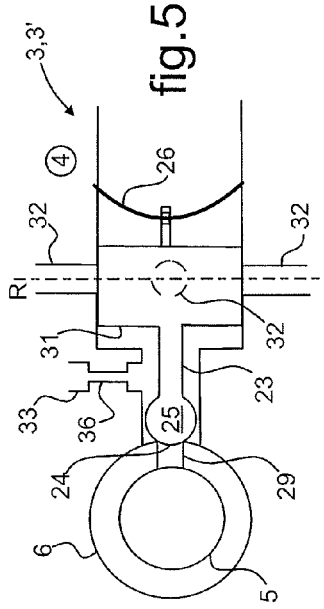
FIGS. 5 to 8 are diagrams showing successive ways of operating a hydraulic valve included in the various servo-controls shown in FIGS. 2 to 4.

More particularly in FIG. 5, the pin 23 is held in the engaged position by the elastically deformable means 26 formed by the spring blade(s) applying axial thrust against the pin 23 towards the emergency valve member 6. The head 25 is held pressed against the cavity 24 by closing the C channel 29. Other than in the event of the main valve member 5 seizing, the emergency valve member 6 is blocked in position by the head 25 and the cavity 24 co-operating by mutual engagement.

Figure 6:
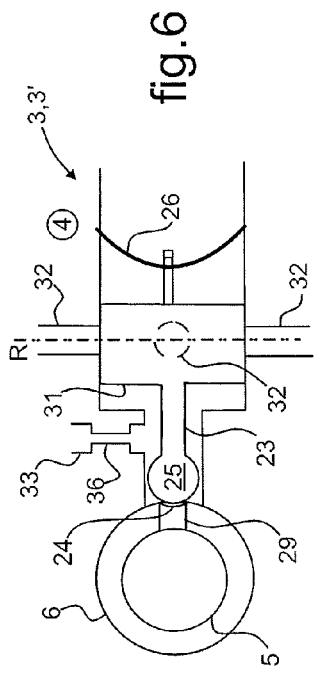

In FIG. 6, in the event of the main valve member 5 seizing, the emergency valve member 6 tends to be entrained to slide inside the valve cylinder 4 by the main valve member 5. Regardless of how small the amplitude of such a movement of the emergency valve member 6 might be, this movement causes the head 25 to slide inside the cavity 24 into an intermediate position of the pin 23.

In the intermediate position of the pin 23, the head 25 is held engaged inside the cavity 24 being partially released from the engagement between the cavity 24 and the pin 23. Since the pin 23 is slidably engaged inside the cavity 24 via the head 25, the emergency valve member 6 is held in the intermediate position of the pin 23 while it is prevented from moving in part relative to the valve cylinder 4. Such partial prevention of movement is considered to be "floating" because of the relative sliding caused between the cavity 24 and the head 25.

In the intermediate position of the pin 23, admission of fluid from the C channel 29 into the inside of the chamber 30 is allowed. The fluid admitted into the inside of the chamber 30 pushes the pin 23 back into the disengaged position, in which disengagement position the head 25 is placed totally outside the cavity 24, as shown in FIG. 7.

Figure 7:
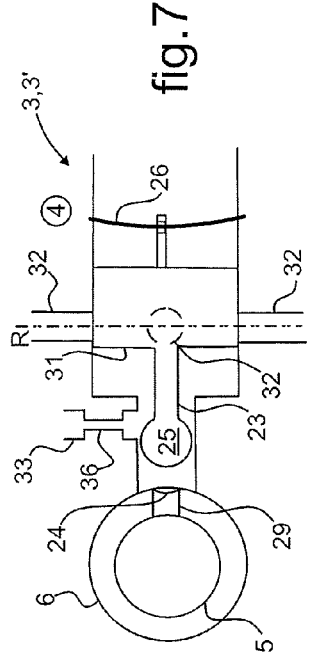
Figure 8:
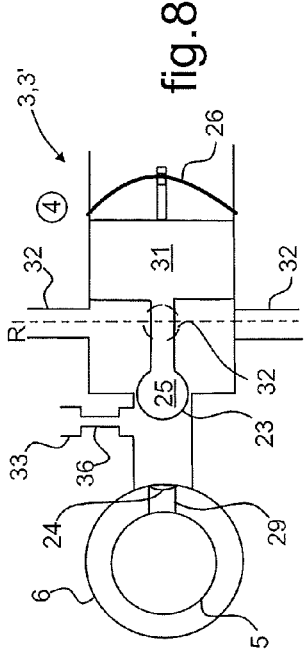

In FIGS. 7 and 8, blocking of the emergency valve member 6 relative to the valve cylinder 4 is inhibited because the pin 23 has passed into the disengaged position.

With reference to FIGS. 2 to 10 as a whole, the valve cylinder 4 includes a fluid passage referred to as an "E" channel 33 that opens out upstream from the piston 31 in the travel direction of the pin 23 from the engaged position towards the disengaged position. The E channel 33 is a channel providing connection between the chamber 30 and the discharge A duct 17' so as to allow fluid from the C channel 29 in the engaged position of the pin 23 inside the cavity 24 to escape, should that be necessary. Such an escape of fluid might be the result of an unwanted source of leakage between the cavity 24 and the head 25.

It should also be observed that the fluid flowing inside the discharge A duct 17' is at a pressure lower than the pressure of the fluid flowing in the admission A duct 17. Such a pressure difference is induced, for example, by the return A pipe 18' towards the fluid source 16 being connected to the open air, or at least by the discharge A duct being pressurized at a pressure lower than that of the fluid admitted under pressure into the hydraulic valve 3, 3' by means of the pump 14'.

Admitting fluid into the chamber 30 via the E channel 33 serves to lubricate the chamber 30 and avoids any excessive rise in pressure inside the chamber 30 upstream from the piston 31 in the flow direction of the fluid admitted into the chamber 30 from the C channel 29.

Furthermore, D channels 32 are arranged in the valve cylinder 4 between the chamber 30 and respective ones of the A ducts 17, 17' and the B ducts 19, 19'. In the engaged position of the pin 23, as shown in FIGS. 2 to 5, the D channels 32 are shut off by the piston 31 so that the admission of fluid into the inside of the D channels 32 is not effective.

In FIGS. 2 to 8, the D channels 32 open out into the chamber 30 in a common radial plane R. In FIG. 9, the D channels 32 in communication with the A ducts 17, 17' and the D channels in communication with the B ducts open out into the chamber 30 in respective radial planes R1 and R2.

More particularly, the D channels 32 in communication with the A ducts 17, 17' open out into the chamber 30 in a first radial plane R1 and the D channels 32 in communication with the B ducts 19, 19' open out into the chamber 30 in a second radial plane R2. The first radial plane R1 is preferably upstream from the second radial plane R2 in the flow direction of the fluid admitted into the chamber 30 from the C channel 29.

Each hydraulic valve 3, 3' is fitted with holder means for holding the pin 23 in the disengaged position independently of any interruption in the operation of the mover means 27.

In FIGS. 2 to 9, said holder means are formed by the spring blade(s) 26. In the disengaged position of the pin 23, the spring blade(s) 26 is/are put back by the pin 23 causing it to become deformed with curvature that is the reverse of its initial curvature in the engaged position of the pin 23. In this inverted curvature position, the spring blade(s) exert(s) a traction force on the pin 23 in the direction opposite to the thrust direction in which force was exerted on the pin 23 when in the engaged position.

In FIG. 10, said holder means are formed by an elastically deformable clip 34 arranged on the valve cylinder 4, the clip 34 controlling by engaging in a housing 35 formed in the pin 23.

In FIGS. 5 to 10, the E channel 33 is in fluid flow communication with the chamber 30 and it is appropriate to prevent the fluid admitted under pressure into the chamber 30 being admitted into the E channel 33 via the C channel 29 in the disengaged position of the pin 23. For this purpose, it is proposed to provide a constriction 36 in the E channel 33.

Such a constriction 36 allows the escape of any fluid that might be admitted accidentally into the inside of the chamber 30 under the effect of a said leakage source between the head 25 and the cavity 24. Nevertheless, the constriction 36 serves to increase the head loss needed for discharging from the chamber 30 any fluid that is admitted under pressure from the admission A channel into the chamber 30 via the E channel 33.

In the disengaged position of the pin 23, the D channels 32 are in fluid flow communication with the chamber 30. As a result, the A ducts 17, 17' and the B ducts 19, 19' are in fluid flow communication with one another, thereby having the effect of rendering inoperative the fluid pressure exerted on either side of the rod 9 co-operating with the actuator cylinder 7, 8 associated with hydraulic valve 3, 3'.

In the event of a servo-control including a hydraulic actuator 2 having a single actuator cylinder 7, as shown in FIGS. 1 and 2, mechanical connection means 37 provide direct mechanical connection between the valve control member 15 and the blade feathering member 14, such that the blade 1 can be controlled directly by the valve control member 15 so as to avoid making use of a faulty servo-control.

Such mechanical connection means 37 may potentially be operated by the human pilot of the rotorcraft, or they may be put into operation spontaneously, depending on a sensor 38 for sensing that the fluid pressure exerted on either side of the rod 9 is ineffective. By way of example, such a sensor 38 may be formed by means for measuring the pressure of fluid flowing through the B pipes 20, 20'.

With a servo-control having a hydraulic actuator 2 with multiple actuator cylinders 7, 8, failure of the fluid pressure exerted on either side of the rod 9 co-operating with one of the actuator cylinders 7, 8 does not prevent a movement being performed by the control member 15 of the main valve member 5 of another hydraulic valve associated with another actuator cylinder 7, 8. It should be understood that these arrangements are applicable regardless of the arrangement of the hydraulic actuator 2, i.e. regardless of whether the actuator cylinders 7, 8 are mounted in tandem as shown in FIG. 3 or are mounted in parallel as shown in FIG. 4.

The ways in which the pin is moved as shown in FIGS. 5 to 10 in the context of the hydraulic type mover means making use of the fluid admitted under pressure into the inside of the hydraulic valve 3, 3' can be transposed by substitution without any particular effort to a hydraulic valve as shown in FIG. 1, in which the mover means are of any other type.

The hydraulic valves 3, 3' shown by way of example in the figures are of the slider type, with the main valve member 5 and the emergency valve member 6 being mounted to slide inside the valve cylinder 4. Nevertheless, it should be understood that the rules set out for the present invention can be transposed without any particular effort to hydraulic valves 3, 3' of the rotary type, in which the main valve member 5 and the emergency valve member 6 are mounted to turn inside the valve cylinder 4.

The general axis along which the pin 23 extends and moves, and by way of corollary the direction of the thrust and/or fraction exerted by the elastically deformable means 26 on the pin 23 extend transversely to the axis along which the main valve member 5 and the emergency valve member 6 move.

Arranging for the pin 23 to move in this way makes it easy to apply the invention to a hydraulic valve of any slide type or of any rotary type. The ways in which the main valve member 5 and the emergency valve member 6 move in sliding or in turning inside the valve cylinder 4 of the hydraulic valve 3, 3' have no effect on the conditions for using and moving the pin 23 either to block the emergency valve member 6 relative to the valve cylinder 4 by pin engagement, or on the contrary to inhibit such blocking.

What is claimed is:

1. A double hydraulic valve of a servo-control for feathering the blades of a rotorcraft rotor, the hydraulic valve comprising:

a valve cylinder having A ducts dedicated to providing a hydraulic connection between the hydraulic valve and a source of fluid under pressure, the A ducts comprising at least an admission A duct providing fluid admission from the outside to the inside of the hydraulic valve and at least one discharge A duct providing fluid discharge out from the hydraulic valve, the valve cylinder having B ducts dedicated to providing a hydraulic junction between the hydraulic valve and a cylinder of a hydraulic actuator of the servo-control, referred to as the actuator cylinder, the B ducts comprising a pair of B ducts providing fluid flow between the inside and the outside of the hydraulic valve;

a main valve member movably mounted inside the valve cylinder and controllable by a control member, the main valve member providing A channels dedicated to fluid flow through the hydraulic valve between the A ducts and the B ducts, the admission A duct and the discharge A duct being in fluid flow communication via A channels selectively with one or the other of the B ducts depending on the respective positions of the main valve member inside the valve cylinder;

an emergency valve member interposed between the valve cylinder and the main valve member, the emergency valve member movably housing the main valve member and being movably mounted inside the valve cylinder, the emergency valve member having B channels that are dedicated to fluid flow between the A channels and either the A ducts or the B ducts, selectively depending on the respective positions of the main valve member; and positioning means for positioning the emergency valve member in a predefined position inside the valve cylinder, in which predefined position the emergency valve member, the A channels, and the B channels are in fluid flow communication in pairs, the positioning means making use at least of elastically deformable means bearing against the valve cylinder, the emergency valve member being authorized to move inside the valve cylinder together with the main valve member under the effect of the emergency valve member being entrained by friction from the main valve member in the event of it seizing inside the emergency valve member against thrust exerted by the elastically deformable means;

wherein said positioning means are means for blocking the emergency valve member against the valve cylinder by a pin mounted to move relative to the valve cylinder and co-operating by sliding thrust engagement with a cavity of the emergency valve member, the pin being movable between an engaged position in which a head of the pin is received in the cavity under the effect of the thrust exerted against the pin by the elastically deformable means, and a disengaged position in which said head is totally disengaged from the cavity by mover means for causing the pin to move against the thrust exerted on the pin by the elastically deformable means, operation of the mover means depending on relative movement between the emergency valve member and the valve cylinder serving to release at least in part said cavity by the head of the pin sliding inside the cavity;

wherein the mover means for moving the pin are means for applying fluid thrust to the pin, which is provided with a piston having applied thereagainst the fluid that is admitted under pressure into the inside of the hydraulic valve.

2. A hydraulic valve according to claim 1, wherein the pin is movably received in a chamber of the valve cylinder and is arranged as a plunger for closing a first fluid passage referred to as a C channel, opening out into the chamber through the cavity and being in fluid flow communication with any one of said A ducts and B ducts, and at least a partial setback in the cavity allowing fluid to be admitted into the inside of the chamber from the C channel.

3. A hydraulic valve according to claim 2, wherein the C channel is in fluid flow communication with the admission A duct.

4. A hydraulic valve according to claim 2, wherein the chamber is in fluid flow communication with the discharge A duct via a third fluid comprising an E channel, said E channel opening out into any position of the pin upstream from the piston in the travel direction of the pin from the engaged position towards the disengaged position.

5. A hydraulic valve according to claim 4, wherein the E channel includes a section constriction.

6. A hydraulic valve according to claim 1, wherein the hydraulic valve has means for establishing fluid flow communication between all of the A ducts and the B ducts in the disengaged position of the pin.

7. A hydraulic valve according to claim 6, wherein the valve cylinder has second fluid passages comprising D channels, said D channels being fluid passages respectively for a first D channel between the chamber and the admission A duct, for a second D channel between the chamber and the discharge A duct, for a third D channel between the chamber and one of the B ducts, and for a fourth D channel between the chamber and the other one of the B channels, the outlet to the chamber of the D channels being closed off jointly by the piston in the engaged position of the pin and being uncovered by the piston in the disengaged position of the pin.

8. A hydraulic valve according to claim 7, wherein the D channels open out into the chamber in a common radial plane considered to be inside the chamber relative to the axial travel direction of the pin, fluid flow communication being established between all of the A ducts and the B ducts simultaneously.

9. A hydraulic valve according to claim 7, wherein the D channels open out into the chamber in different radial planes relative to the travel direction of the pin inside the chamber, fluid flow communication being established progressively between all of the A ducts and the B ducts.

10. A hydraulic valve according to claim 1, wherein the hydraulic valve includes means for holding the pin in the disengaged position independently of any interruption in the operation of the mover means, wherein the means for holding the pin comprises the elastically deformable means.

11. A hydraulic valve according to claim 10, wherein the elastically deformable means is arranged as at least one spring blade, said spring blade(s) being fastened to the valve cylinder and being bidirectionally engaged with the pin, the spring blade(s) exerting thrust against the pin in the engaged position and traction on the pin in the disengaged position as a result of its deformation caused by the pin passing into the disengaged position.

12. A hydraulic valve according to claim 10, wherein the holder means are of the resilient engagement type and comprise an elastically deformable clip co-operating with a housing, the clip and the housing being arranged respectively one in or on the valve cylinder and the other in or on the pin.

13. A hydraulic valve according to claim 1, wherein the hydraulic valve is of the slide type, the main valve member and the emergency valve member being mounted to move in translation inside the valve cylinder.

14. A hydraulic valve according to claim 1, wherein the hydraulic valve is of the rotary type, the main valve member and the emergency valve member being mounted to move angularly inside the valve cylinder.

15. A hydraulic valve according to claim 1, wherein the bearing surface of the head of the pin for bearing against the inside of the cavity is a spherical bearing surface.

16. A hydraulic valve according to claim 1, wherein the operation of the mover means depends on detecting relative movement between the main valve member and the emergency valve member.

17. A servo-control for feathering the blades of a rotorcraft rotor the servo-control including at least one hydraulic actuator having at least one double-acting actuator cylinder and at least one hydraulic valve according to claim 1.

18. A servo-control according to claim 17, the servo-control comprising at least one hydraulic actuator having a plurality of double-acting actuator cylinders, each of the actuator cylinders being fed with fluid by a hydraulic valve associated therewith.

19. A servo-control according to claim 18, the servo-control comprising at least one double-acting hydraulic actuator having two actuator cylinders wherein:
   each actuator cylinder of the hydraulic actuator is in fluid flow communication with a hydraulic valve associated therewith, the B ducts of each of the hydraulic valves being in fluid flow communication with a respective actuator cylinder;
   one of the B ducts of a first hydraulic valve being in fluid flow communication with a first top passage of a first actuator cylinder and the other B duct of the first hydraulic valve being in fluid flow communication with a first bottom passage of the first actuator cylinder;

one of the B ducts of a second hydraulic valve being in fluid flow communication with a second top passage of a second actuator cylinder, and the other B duct of the second hydraulic valve being in fluid flow communication with a second bottom passage of the second actuator cylinder; and the main valve members of each of the hydraulic valves being jointly engaged with a common control member that when operated governs the distribution of fluid through the two hydraulic valves.

20. A servo-control according to claim 19, in which servo-control the actuator cylinders of the hydraulic actuator are mounted in tandem, together housing a common rod.

21. A servo-control according to claim 19, in which servo-control the actuator cylinders of the hydraulic actuator are mounted in parallel, the actuator cylinders housing respective rods that are mechanically connected together.

* * * * *